Jan. 23, 1945. P. P. ANDERSON, JR 2,367,708
REFRIGERATION
Filed April 29, 1941
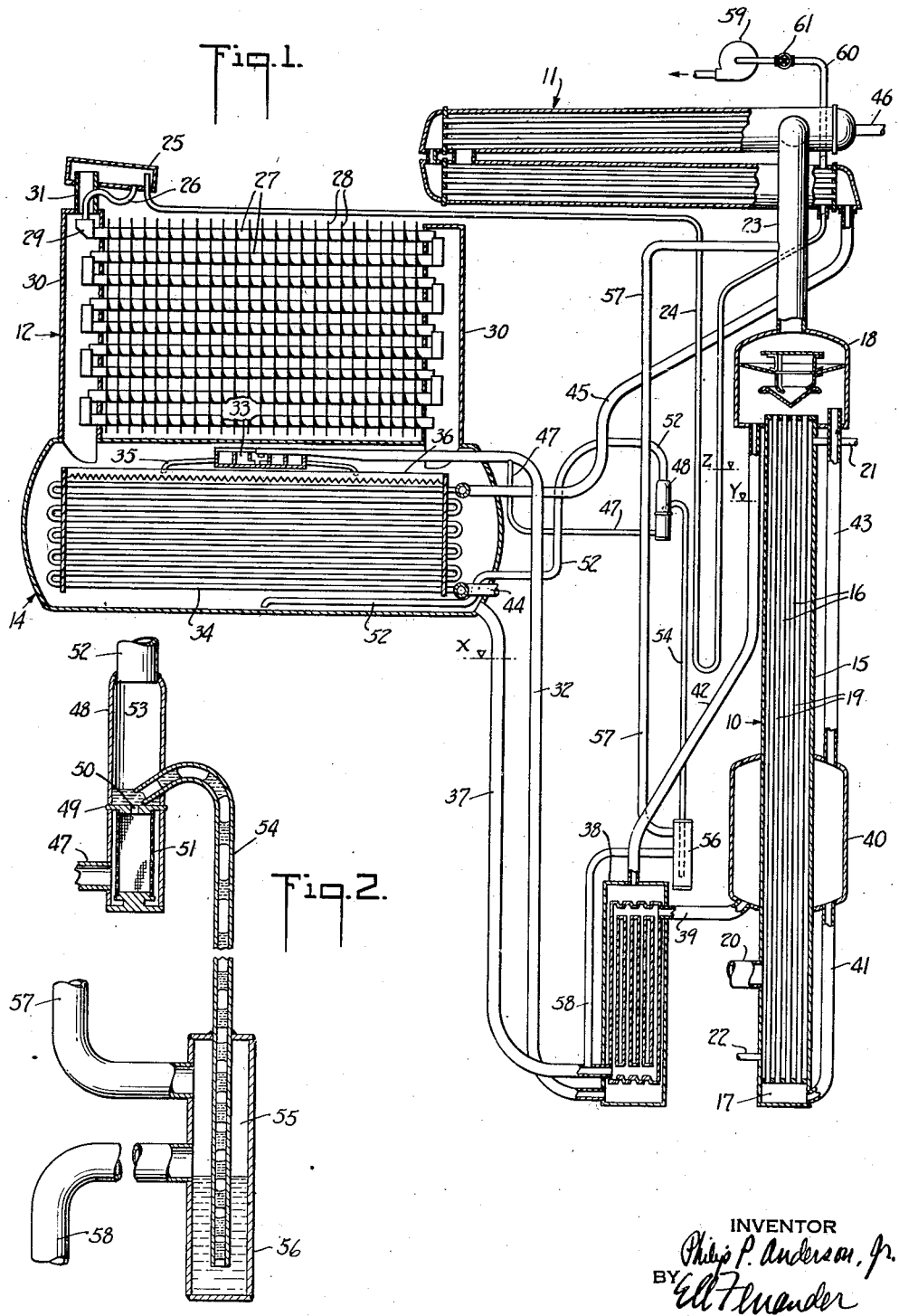
INVENTOR
Philip P. Anderson, Jr.
BY
his ATTORNEY Patented Jan. 23, 1945

2,367,708

UNITED STATES PATENT OFFICE 2,367,708

REFRIGERATION

Philip P. Anderson, Jr., Evansville, Ind., assignor to Servel, Inc., New York, N. Y., a corporation of Delaware Application April 29, 1941, Serial No. 390,872

10 Claims. (Cl. 62—119)

This invention relates to refrigeration, and more particularly to refrigeration systems of the absorption type.

It is an object of the invention to provide an improvement in a refrigeration system for transferring non-condensible gases from the absorber to the condenser or other part of a refrigeration system.

When non-condensible gases collect in the absorber, the effectiveness of the absorber is reduced because the non-condensible gases can blanket off and render ineffective a part of the absorber in which absorption of refrigerant gas by absorption liquid is normally effected. Further, the accumulation of non-condensible gases in the absorber and the resulting increase in pressure therein is undesirable, because the efficiency of the refrigeration system is reduced and the normal operation of the absorber and evaporator may be disturbed.

The collecting of non-condensible gases in the condenser within a reasonable limit is not objectionable, and this is particularly true in a two-pressure system in which the condenser operates at a higher pressure than the absorber. By collecting non-condensible gases in the condenser the gases occupy a considerably smaller space since such gases are subjected to a higher pressure in the condenser than in the absorber. When non-condensible gases are allowed to collect in the condenser the effectiveness of the condenser to liquefy refrigerant vapor is not impaired so long as the quantity of non-condensible gases collected therein does not become unreasonably large. In order to prevent too large a quantity of non-condensible gases from collecting in the condenser a vacuum pump or other suitable device may be connected to or otherwise associated with the condenser to effect withdrawal of non-condensible gases collected therein.

In accordance with this invention non-condensible gases are transferred from the absorber to the condenser with the aid of absorption liquid which is an active fluid within the system. This is accomplished by continuously and automatically utilizing a relatively small part of the absorption liquid stream flowing to the absorber from the generator to entrain non-condensible gases in the absorber. The entraining liquid is diverted automatically by simple gravity action with the non-condensible gases being entrained in such a manner that small quantities of the gas are trapped by slugs or blocks of liquid which pass downwardly in a vertically extending conduit. The trapped gas is compressed and allowed to escape to the condenser at a higher pressure from the lower part of the conduit, while the diverted liquid effecting transfer of the non-condensible gases from the absorber joins the stream of absorption liquid flowing from the absorber back to the generator.

The invention, together with the above and other objects and advantages thereof, will be better understood from the following description taken in connection with the accompanying drawing forming a part of this specification, and of which:

Fig. 1 more or less diagrammatically illustrates a refrigeration system embodying the invention; and Fig. 2 is an enlarged fragmentary view of parts shown in Fig. 1 to illustrate the invention more clearly.

Referring to Fig. 1 the present invention is embodied in a two-pressure absorption refrigeration system like that described in application Serial No. 239,762 of A. R. Thomas and P. P. Anderson, Jr., filed November 10, 1938, now Patent No. 2,282,503, granted May 12, 1942. A system of this type operates at low pressures and includes a generator or vapor expeller 10, a condenser 11, an evaporator 12, and an absorber 14 which are interconnected in such a manner that the pressure differential in the system is maintained by liquid columns.

The disclosure in the aforementioned Thomas and Anderson application may be considered as being incorporated in this application, and, if desired, reference may be had thereto for a detailed description of the refrigeration system. In Fig. 1 the generator 10 includes an outer shell 15 within which are disposed a plurality of vertical riser tubes 16 having the lower ends thereof communicating with a space 17 and the upper ends thereof extending into and above the bottom of a vessel 18. The space 19 within shell 15 forms a steam chamber about the tubes 16 to which steam is supplied through a conduit 20. The space 19 provides for full length heating of tubes 16, a vent 21 being formed at the upper end of shell 15. A conduit 22 is connected to the lower part of shell 15 for draining condensate from space 19.

The system operates at a partial vacuum and contains a water solution of refrigerant in absorbent liquid, such as, for example, a water solution of about 40% lithium chloride by weight. With steam being supplied through conduit 20 to space 19 at atmospheric pressure, heat is applied to tubes 16 whereby water vapor is expelled from solution. The absorption liquid is raised by gas or vapor-lift action with the expelled water vapor forming a central core within an upwardly rising annulus of the liquid. The expelled water vapor rises more rapidly than the liquid with the liquid flowing along the inside walls of tubes 16.

The water vapor flows upwardly through the tubes or risers 16 into vessel 18 which serves as a vapor separator. Due to baffling in vessel 18, water vapor is separated from raised absorption solution and flows through conduit 23 into condenser 11. The condensate formed in condenser 11 flows through a U-tube 24 into a flash chamber 25 and from the latter through a conduit 26 into evaporator 12.

The evaporator 12 includes a plurality of horizontal banks of tubes 27 disposed one above the other and to which are secured heat transfer fins 28 to provide a relatively extensive heat transfer surface. The liquid flowing to evaporator 12 is divided in any suitable manner for flow through the uppermost banks of tubes 27. The dividing of liquid may be effected by providing a liquid distributing trough 29 into which the liquid flows through the conduit 26. The water passes through successively lower banks of tubes through suitable end connections which are open to permit escape of vapor from the tubes, and any excess liquid is discharged from the lowermost bank of tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 28 passes out into end headers 30 which are connected at their lower ends to absorber 14. The flash chamber 25 is provided to take care of any vapor flashing of liquid being fed to evaporator 12 through U-tube 24. The flashed vapor formed in the initial cooling of the liquid flowing from condenser 11 passes through a conduit 31 into one of the headers 30 and mixes with vapor formed in the evaporator 12, so that disturbances in the evaporator due to vapor flashing are avoided.

In absorber 14 refrigerant vapor is absorbed into concentrated absorption liquid which enters through a conduit 32. The entering absorption liquid flows into a vessel 33 in which liquid is distributed laterally or cross-wise of a plurality of vertically disposed pipe banks 34 which are arranged alongside of each other. The liquid flows from vessel 33 through conduits 35 into a plurality of liquid holders and distributors 36 which extend lengthwise of and above the uppermost horizontal branches of pipe banks 34. Absorption liquid is siphoned over the walls of the liquid holders 36 to effect complete wetting of the uppermost pipe sections. Liquid drips from each horizontal pipe section onto the next lower pipe section, whereby all of the pipe sections are wetted with a film of liquid.

The water vapor formed in evaporator 12 passes through the headers 30 into the absorber 14 where it is absorbed by the absorption liquid and, due to such absorption of water vapor, the absorption liquid is diluted. The diluted absorption liquid flows through a conduit 37, a first passage in liquid heat exchanger 38, conduit 39, vessel 40 and conduit 41 into the lower space 17 of generator 10. Water vapor is expelled out of solution in generator 10 by heating, and the solution is raised by gas or vapor-lift action in riser tubes 16, as explained above.

The absorption liquid in vessel 18 is concentrated since water vapor has been expelled therefrom in generator 10. This concentrated absorption liquid flows through a conduit 42, a second passage in liquid heat exchanger 38, and conduit 32 into the upper part of absorber 14. This circulation of absorption liquid results from the raising of liquid by vapor-lift action in vertical riser tubes 16, whereby the liquid can flow to absorber 14 and return from the latter to the generator 10 by force of gravity.

The vessel 40 is cylindrical in shape and disposed about shell 15 of generator 10. By arranging vessel 40 to receive heat derived from the steam in space 19, preheating of absorption liquid flowing to generator 10 is effected. The upper part of vessel 40 is connected by a conduit 43 to vessel 18, so that the pressure in vessel 40 is equalized with the pressure in the upper part of generator 10 and condenser 11.

The heat liberated with absorption of water vapor in absorber 14 is transferred to a cooling medium, such as water, for example, which flows upward through the vertically disposed pipe banks 34. The cooling medium enters the lower ends of the pipe banks 34 through a conduit 44 and leaves the upper ends of the pipe banks 34 through a conduit 45. The conduit 45 is connected to condenser 11 whereby the same cooling medium may be utilized to cool both condenser 11 and absorber 14, and from condenser 11 the cooling medium flows through a conduit 46 to waste.

The system operates at low pressures with the generator 10 and condenser 11 operating at one pressure and the evaporator 12 and absorber 14 operating at a lower pressure, the pressure differential therebetween being maintained by liquid columns. Thus, the liquid column formed in tube 24 maintains the pressure differential between condenser 11 and evaporator 12, the liquid column in conduit 37 maintains the pressure differential between the outlet of absorber 14 and generator 10, and the liquid column formed in conduit 32 and connected parts including conduit 42 maintains the pressure differential between the inlet of the absorber and the upper part of generator 10. In operation, the liquid columns may form in conduits 37, 42 and down-leg of tube 24 to the levels $x$, $y$ and $z$, for example. The conduits are of such size that restriction to gas flow is effected without appreciably restricting flow of liquid.

The liquid column formed in vessel 40 and conduit 41 provides the liquid reaction head for raising liquid in riser tubes 16 by vapor-lift action. The vessel 40 is of sufficient volume to hold the liquid differential in the system and is of such cross-sectional area that the liquid level therein does not appreciably vary, so that a substantially constant reaction head is provided for lifting liquid in generator 10.

In accordance with this invention suitable structure is embodied in the refrigeration system just described in order to transfer non-condensible gases from absorber 14 to condenser 11. This structure is hermetically sealed within the system and includes a vertical conduit 47 into which is diverted a portion of the absorption liquid flowing through conduit 32 from generator 10 to absorber 14. The lower end of conduit 47 is connected to the bottom part of a vessel 48 having at an intermediate region thereof a dividing wall 49 formed with a restriction or orifice 50. The dividing wall 49 and bottom of vessel 48 are formed with raised portions to receive and hold in position a cylindrical-shaped screen 51.

To the lower part of absorber 14 is connected a conduit 52 having an inverted U-shaped portion one leg of which is connected to an upper space 53 of vessel 48. At a region just above the dividing wall 49 is connected the upper curved or rounded portion of a conduit 54, the lower end of which extends into the lower part of a chamber 55 formed by vessel 56. To the upper part of chamber 55 is connected a conduit 57 which extends vertically upward and is connected at its upper end to conduit 23 through which expelled vapor flows from generator 10 to condenser 11. To an intermediate part of vessel 56 is connected an overflow conduit 58 which is connected at its lower end to conduit 37 through which absorption liquid flows from absorber 14 to liquid heat exchanger 38. Thus, the absorption refrigeration system comprises the first or main circuit for the absorption solution including the conduit 42 connected to the separating vessel 18 at the top of the generator 10, the first passage of the liquid heat exchanger 38, conduit 32, absorber 14, conduit 37, second passage of the liquid heat exchanger 38, conduit 39, vessel 40, conduit 41 and generator 10; and an auxiliary branch circuit for the absorption solution connected between the conduits 32 and 37 and including conduit 47, vessel 48, conduit 54, vessel 56 and conduit 58.

After the refrigeration system is charged with a suitable water solution of refrigerant in absorption liquid, the system is evacuated in any suitable manner, as, for example, by a vacuum pump 59 connected by a conduit 60 to the lower part of condenser 11. A suitable valve 61 is provided in conduit 60 to maintain the system at the evacuated low pressure.

During the operation of the refrigeration system, noncondensible gases may collect in condenser 11, evaporator 12 and absorber 14. The non-condensible gases in the lower pressure side of the system are carried to the bottom part of absorber 14 by the sweeping action of the water vapor entering the top of the absorber through the headers 30. By sweeping action it is meant that a downward movement is imparted to the non-condensible gases by the high velocity of the water vapor flowing into the absorber. The non-condensible gases are transferred from absorber 14 to condenser 11 by diverting into conduit 47 a small portion of the absorption liquid flowing toward the absorber. The cylindrical screen 51 insures removal of any matter in the absorption liquid which may tend to clog the orifice 50, and the orifice in turn restricts and limits the rate at which liquid is diverted into conduit 47 from the main stream of absorption liquid flowing through conduit 32.

The liquid passing into the upper space 53 of vessel 48 through orifice 50 enters the open upper end of conduit 54, so that the conduit is closed off and sealed from the non-condensible gases passing into space 53 from absorber 14 through conduit 52. When the liquid level rises sufficiently in the upwardly extending curved or bent portion of conduit 54, the small quantity of liquid within the open end is siphoned past the bend into the downwardly depending portion extending into chamber 55. With such siphoning of liquid, the liquid level falls in space 53 below the upper open end of conduit 54 to permit non-condensible gas to pass into the upper bent or curved portion of the conduit. The liquid level in space 53 then rises to close and seal off the upper end of conduit 54 and, when the liquid level again rises sufficiently, a small quantity of liquid is once more siphoned into the downwardly depending portion of conduit 54. In this manner small volumes of non-condensible gases are withdrawn from the lower part of absorber 14 and trapped between successive bodies or slugs of liquid formed at the upper curved or bent portion of conduit 54.

The conduit 54 preferably is of such size that flow of liquid is not appreciably restricted with the internal diameter being such that gas and liquid cannot pass each other while flowing through the conduit. When employing a lithium chloride solution of about 40% concentration by weight in a system of the type described, a conduit having an internal diameter of about .25 inch has operated in a satisfactory manner to trap small quantities of gas between slugs or bodies of liquid.

As the slugs of liquid and trapped gas pass downward through conduit 54 the gas is compressed. From the lower end of conduit 54 the gas passes upwardly through liquid in chamber 55 and then flows through conduit 57 into conduit 23. The non-condensible gases entering conduit 23 are swept into the upper part of condenser 11 by the expelled vapor flowing upward from generator 10 at a relatively high velocity.

The absorption liquid entering chamber 55 through conduit 54 overflows from vessel 56 through conduit 58 to join absorption liquid flowing from absorber 14 through conduit 37. It will be apparent that conduits 47, 54 and 58 and interconnected vessels 48 and 56 provide a path of flow for absorption liquid which is in parallel with absorber 14 and about which liquid is by-passed. By returning the diverted or by-passed absorption liquid to generator 10 through heat exchanger 38 instead of by passing the latter, all of the liquid flowing to the generator flows in heat exchange relation with liquid flowing from the generator, so that loss of heat within the system is avoided.

The parts just described for providing a by-pass for absorption liquid are properly proportioned and located with respect to each other to insure the maintenance of a proper liquid seal in conduit 54 and vessel 56 between the low and high pressure sides of the refrigeration system. In other words, the column of liquid slugs and vapor in conduit 54 and the liquid in vessel 56 must be adequate to balance the pressure differential existing between condenser 11 and absorber 14. This is readily accomplished by making conduit 54 of proper length and locating the upper connection of overflow conduit 58 sufficiently high at the side of vessel 56. The gas passing downward through conduit 54 is compressed to a pressure which equals the pressure existing in condenser 11 plus the height of the liquid column in vessel 56, that is, the height of liquid between the lower end of conduit 54 and the liquid surface level at the connection of overflow conduit 58.

The non-condensible gases which may collect in condenser 11, together with the gases transferred from the absorber 14, are carried to the dead or far end of condenser 11 in the bottom part thereof by the sweeping effect of the expelled water vapor flowing into the condenser. The non-condensible gases transferred from the absorber 14 to condenser 11 occupy considerably less space in the condenser than in the absorber inasmuch as the condenser is at higher pressure than the absorber. In a refrigeration system of the kind described, by way of example, the normal pressure in the absorber may be about 9 mm. Hg with the pressure in the condenser about 56 mm. Hg. With the transferred gases being at a higher pressure in condenser 11 than in absorber 12, it will be evident that considerably less space is taken up by the gas in the higher pressure side of the refrigerator system.

Moreover, the collection of non-condensible gases in condenser 11 is not subject to the same serious objections that arise when such gases collect in the absorber. In the absorber 14, for example, objectionable increase of pressure takes place with accumulation of non-condensible gases therein. Since the temperature of evaporator 12 is dependent upon the pressure therein, it will be seen that any increase in pressure in the low pressure side of the system tends to bring about an increase in evaporator temperature. In addition, the effectiveness of the absorber is reduced because the non-condensible gases occupy and render ineffective a part of the absorber in which absorption of water vapor by absorption liquid is normally effected. In condenser 11, on the other hand, the only real objection to collection of non-condensible gases therein is that the effective condensing surface is reduced. As pointed out above, however, the non-condensible gases occupy less space in the condenser than in the absorber because of the higher pressure existing in the condenser. A further advantage resulting from the transfer of non-condensible gases from the absorber to the condenser is that, in removing such gases from the system, a vacuum pump connected to the condenser is not required to pump to as low a pressure as when connected to the absorber in the low pressure side of the refrigeration system. The vacuum pump 59 may be of any suitable type and operated from time to time to limit the quantity of non-condensible gases permitted to collect in the lower part of condenser 11. In view of the considerably higher pressure prevailing in the condenser 11 than in the absorber 14, a less expensive vacuum pump can be employed when it is connected to the higher pressure side rather than the lower pressure side of the refrigeration system. For example, a simple water aspirator type of vacuum pump may be satisfactorily employed in exhausting the non-condensible gases from condenser 11 to atmosphere with the aspirator being operated from the city water supply or other suitable source of supply at a pressure of at least 30 pounds per square inch.

While a single embodiment of the invention has been shown and described, it will be apparent to those skilled in the art that various modifications and changes may be made without departing from the spirit and scope of the invention, as pointed out in the following claims.

What is claimed is:

1. A two-pressure refrigerating system having two sides adapted to operate at different pressures and including a plurality of parts interconnected to provide a first circuit for circulation of absorption liquid, an auxiliary branch circuit connected to the first circuit and in which absorption liquid is adapted to flow, said auxiliary branch circuit having one point connected for communication with one side of the system and another point connected for communication with the other side of the system, said auxiliary branch circuit being so constructed and arranged that absorption liquid flowing therethrough is capable of transferring non-condensible gas from said one point to said other point, said auxiliary branch circuit being so connected with said first circuit that circulation of liquid in said first circuit effects flow of liquid in said auxiliary branch circuit.

2. A two-pressure refrigerating system having two sides adapted to operate at different pressures and including a plurality of parts interconnected to provide a first closed circuit for circulation of liquid, means to produce circulation of liquid in said first circuit by vapor-lift action, an auxiliary branch circuit connected to the first circuit and in which liquid is adapted to flow, said auxiliary branch circuit having one point connected for communication with one side and another point connected for communication with the other side of the system, said auxiliary branch circuit being so constructed and arranged that liquid flowing therethrough is capable of transferring non-condensible gas from said one point to said other point, and said auxiliary branch circuit being associated with said first circuit in such a manner that liquid is diverted from the first circuit into the auxiliary branch circuit to effect said transfer of gas from said one point to said other point and thereafter returned to said first circuit.

3. A two-pressure refrigerating system having two sides adapted to operate at different pressures, one of said sides including a generator and a condenser and the other including an evaporator and an absorber, means including a heat exchanger to provide a circuit for circulation of absorption liquid through and between said generator and said absorber, said circuit being provided with a by-pass having one point in communication with said one side and another point in communication with said other side, said by-pass being so constructed and arranged that a portion of the liquid flowing to said absorber is diverted into the by-pass to transfer non-condensible gas from said one point to said other point, and said by-pass providing a path of flow for diverted liquid from said other point to a part of said circuit through which absorption liquid flows from said absorber toward said generator and at a region thereof before such liquid passes through said liquid heat exchanger.

4. A two-pressure absorption refrigeration system comprising a generator and condenser arranged to operate at one pressure and an evaporator and absorber arranged to operate at a lower pressure, connections for the aforementioned parts to provide circuits for circulation of refrigerant and absorption liquid, structure providing a by-pass in said absorption liquid circuit including a chamber, a vertical conduit having the lower end thereof extending into the bottom part of said chamber, means for diverting into the upper end of said conduit a part of the absorption liquid flowing from the generator to the absorber, the upper end of said conduit being in open communication with the absorber whereby non-condensible gas collecting in the absorber is entrained by the diverted absorption liquid, and conduit means connecting the upper part of said chamber and said condenser whereby entrained gas discharged from the lower end of said conduit can flow to the condenser.

5. A refrigeration system having a plurality of parts including an absorber connected to provide a circuit for circulation of absorption solution in which refrigerant vapor is absorbed into solution in the absorber and structure whereby only a portion of the circulating absorption solution is utilized to trap gas in the absorber non-absorbable by the solution therein and transfer such gas from the absorber to another part of the system, said structure including a vertically extending conduit having the upper end associated with one region of said circuit and the lower end associated with another region of said circuit, the upper end of said conduit also being in communication with said absorber, and said structure being so constructed and arranged that a portion of the absorption liquid flowing to said absorber for use therein is diverted from said circuit into said conduit at said one region and utilized to trap gas in said conduit, the gas carried downwardly in said conduit by diverted liquid passing from the lower end of said conduit to said other part, and said diverted liquid passing from the lower end of said conduit and mixing with liquid circulating in said circuit at said other region.

6. A refrigeration system having a plurality of parts including a generator, an absorber, means connecting the aforementioned parts to provide a circuit for circulation of absorption solution in which refrigerant vapor is absorbed into solution in the absorber and vapor is expelled from solution in the generator, and structure embodied in the system whereby only a portion of the circulating absorption solution flowing toward said absorber is utilized to trap gas in the absorber non-absorbable by the solution therein and transfer such gas from the absorber to the condenser, said structure being so constructed and arranged that gas non-absorbable in the absorber is always trapped by absorption solution during operation of the system and while circulation of absorption solution is effected.

7. An absorption refrigeration system comprising a plurality of parts including an absorber interconnected for circulation of liquid and refrigerant, structure for exhausting non-condensible gas from said absorber, said structure including means for bringing only a portion of such circulating liquid into contact with non-condensible gas collecting in said absorber at a region constituting the farthest point in the path of flow of non-condensible gases swept into such region by refrigerant vapor introduced into said absorber.

8. An absorption refrigeration system comprising a plurality of interconnected parts including an evaporator in which evaporation of liquid refrigerant takes place and an absorption liquid circuit including an absorber in open communication with said evaporator, structure for exhausting non-condensible gas from said absorber, said structure including means for bringing only a portion of the circulating absorption liquid flowing toward said absorber into contact with non-condensible gas collecting in said absorber at a region constituting the farthest point in the path of flow of non-condensible gases swept into such region by refrigerant vapor formed in said evaporator.

9. An absorption refrigeration system comprising a plurality of parts including an evaporator in which evaporation of refrigerant takes place in a partial vacuum, an absorber always in open communication with said evaporator to provide passage means whereby fluid only passes in one direction from said evaporator to said absorber, a generator, a condenser having an exhaust port for inert gas, said absorber and said generator being interconnected to provide a circuit for circulation of absorption liquid, structure for transferring non-condensible gas from said absorber to said condenser and comprising a vertically extending conduit having the upper end associated with one region of said circuit and the lower end associated with another region of said circuit, the upper end of said conduit also being in communication with a portion of said absorber constituting the farthest point in the path of flow of non-condensible gases swept into such portion by refrigerant vapor formed in said evaporator and passing at a high velocity through said passage means into said absorber, said structure being so constructed and arranged that a portion of the absorption liquid circulating in the system is diverted at said one region and utilized to trap gas in said conduit, the gas carried downwardly in said conduit by diverted liquid passing from the lower end of said conduit to said condenser for exhaustion therefrom, and said diverted liquid passing from the lower end of said conduit and mixing with liquid circulating in said circuit at said other region.

10. A two-pressure absorption refrigeration system comprising a plurality of interconnected elements to provide a closed circuit for circulating absorption liquid, a vessel connected in the circuit to receive absorption liquid at the bottom thereof and non-condensible gases at the top thereof, a vertical conduit having a curved upper end in the vessel, a separating chamber into which the lower end of the vertical conduit extends, and conduits connecting the upper and lower portions of the separating chamber to the circuit whereby absorption liquid entering the bottom of the vessel intermittently siphons into the curved upper end of the vertical conduit to trap non-condensible gases therein between slugs of liquid and transfer the liquid and gas to the separating chamber, said gas and liquid separating in the separating chamber and flowing through the conduits to other parts of the circuit.

PHILIP P. ANDERSON, Jr.